(12) United States Patent  (10) Patent No.: US 7,185,613 B2
Arvanitis  (45) Date of Patent: Mar. 6, 2007

(54) FASHION ACCESSORY

(76) Inventor: Christina Arvanitis, 45 Lincoln Blvd., Bethpage, NY (US) 11714

( * ) Notice: Subject to any disclaimer, the term of this patent is extended or adjusted under 35 U.S.C. 154(b) by 0 days.

(21) Appl. No.: 11/096,112

(22) Filed: Mar. 31, 2005

(65) Prior Publication Data
US 2006/0219189 A1    Oct. 5, 2006

(51) Int. Cl.
A01K 27/00    (2006.01)
A41D 20/00    (2006.01)

(52) U.S. Cl. .................. 119/860; 119/857; 63/3; 63/37

(58) Field of Classification Search ........... 119/860, 119/856, 858, 863, 864, 865, 792, 857; 63/3, 63/33, 37; 2/170
See application file for complete search history.

(56) References Cited

U.S. PATENT DOCUMENTS

| 2,738,225 | A | * | 3/1956 | Meek | 239/55 |
| 2,808,030 | A | * | 10/1957 | Costanzo | 119/860 |
| 3,213,830 | A | * | 10/1965 | Wiesemann | 119/654 |
| 3,477,409 | A | * | 11/1969 | Costanzo | 119/174 |
| 3,687,114 | A | * | 8/1972 | Berkstresser | 119/654 |
| 3,814,061 | A | * | 6/1974 | Aries et al. | 119/654 |
| 4,047,505 | A | * | 9/1977 | McAndless | 119/654 |
| 4,068,624 | A | * | 1/1978 | Ramney | 119/654 |
| 4,091,766 | A | * | 5/1978 | Colliard | 359/518 |
| 4,184,452 | A | * | 1/1980 | Buzzell et al. | 119/654 |
| 4,208,986 | A | * | 6/1980 | Costanzo | 119/860 |
| 4,465,232 | A | * | 8/1984 | Field | 239/36 |
| 4,722,477 | A | * | 2/1988 | Floyd | 239/36 |
| 4,900,876 | A | * | 2/1990 | Bushman et al. | 119/654 |
| 4,901,674 | A | * | 2/1990 | Bushman et al. | 119/651 |
| 4,926,784 | A | * | 5/1990 | Brightful et al. | 119/860 |
| 4,930,451 | A | * | 6/1990 | Miller et al. | 119/654 |
| 4,972,684 | A | * | 11/1990 | Aitken | 63/8 |
| 5,003,635 | A | * | 4/1991 | Peterson | 2/69 |
| 5,033,122 | A | * | 7/1991 | Smith | 2/209.3 |
| 5,144,913 | A | * | 9/1992 | Yasui | 119/860 |
| 5,146,875 | A | * | 9/1992 | Bolt | 119/654 |
| 5,184,573 | A | * | 2/1993 | Stevens, Jr. | 119/654 |
| 5,271,354 | A | * | 12/1993 | Barnett | 119/654 |
| 5,465,689 | A | * | 11/1995 | Winder | 119/654 |
| 5,529,243 | A | * | 6/1996 | Hoyt et al. | 239/56 |
| 5,555,848 | A | * | 9/1996 | Trujillo et al. | 119/654 |
| 5,826,598 | A | * | 10/1998 | Meehan | 132/275 |
| 5,970,921 | A | * | 10/1999 | Fulton | 119/858 |
| 5,980,496 | A | * | 11/1999 | Jacobsen et al. | 604/289 |
| 5,983,839 | A | * | 11/1999 | O'Byrne et al. | 119/860 |
| 6,039,488 | A | * | 3/2000 | Krawczyk et al. | 401/132 |
| 6,101,981 | A | * | 8/2000 | Friend et al. | 119/860 |
| 6,234,118 | B1 | * | 5/2001 | Lahens | 119/860 |
| 6,349,232 | B1 | * | 2/2002 | Gordon | 604/20 |
| 6,357,260 | B1 | * | 3/2002 | Lutz | 63/1.11 |
| 6,382,137 | B1 | * | 5/2002 | Derrieu et al. | 119/654 |
| 6,438,807 | B1 | * | 8/2002 | Ptolemy | 24/484 |
| 6,543,389 | B2 | * | 4/2003 | Hedde | 119/654 |
| 6,557,375 | B1 | * | 5/2003 | Simmons et al. | 63/1.15 |
| 6,763,785 | B1 | * | 7/2004 | Grady | 119/858 |
| 6,936,269 | B2 | * | 8/2005 | Robinson | 424/409 |
| 2005/0132981 | A1 | * | 6/2005 | Berry | 119/856 |

* cited by examiner

Primary Examiner—Yvonne R. Abbott
(74) Attorney, Agent, or Firm—Kenyon & Kenyon LLP

(57) ABSTRACT

A collar, having a support band with a first and a second end, a scented material, and a connection arrangement on the support band, the connection arrangement configured to hold the first and the second end in a desired configuration, wherein the support band has a scent providing arrangement to store a scented material to disperse a scent into an environment around an animal.

7 Claims, 2 Drawing Sheets

FASHION ACCESSORY

FIELD OF THE INVENTION

The present invention relates to a fashion accessory. More specifically, the present invention provides a scented collar with insertable and removable scenting elements to allow the scent surrounding the collar to be modified at the user.

BACKGROUND INFORMATION

Collars are used for many different purposes. These purposes range from providing a connection/handling point between an animal and an animal handler to a fashion accessory for individuals and animals. There are common problems associated with collars and their use, however, and the overall effectiveness of the collar is compromised by these problems. Often, the user of the collar ignores these drawbacks and uses the collar despite the disadvantages. If the user considers the drawbacks too significant, then the user may limit the amount of use of the collar and thereby sacrifice functionality.

Collars are often used by animal handlers in an effort to control the movement of a pet in order to provide a measure of safety for the animal. The collar is attached to the animal (such as a dog or a cat) and a loop is extended from the collar to allow a leash to be connected to the collar. The animal handler may then control the animal by guiding the leash which in turn directs the animal in a desired direction. While well intentioned, some collars do not allow for an animal handler to control other aspects of the animal and therefore they have a serious drawback. An exemplary drawback occurs when collars are used in differing weather conditions. Animals, by their very nature, often produce body scents which can become more pronounced under certain weather conditions. These scents, while being potentially helpful to the animal in certain situations, can offend the handler and others. Changing environmental conditions, such as when the animal is wet or hot, can further amplify the effects of the odors produced.

While scented materials may be hung around the neck of an animal to compensate for the animal odors such hanging materials can become cumbersome or even dangerous to the animal, as these materials may catch on protruding objects the animal passes in its travels. Alternatively, spray chemicals can be used to scent the animal. This can result in allergic reactions of the skin of the animal.

There is therefore a need to provide a collar that will allow the masking of an animals scent under different environmental conditions.

There is also a need to provide a restraint system for an animal that will allow a handler to have control of the animal in a safe and efficient manner.

There is a further need to provide a collar system to allow an individual to accessorize and personalize their pet.

There is a further need to provide a collar system that will allow the overall scent of an animal to change and additionally allow the scents dispersed by the collar to be modified according to the wishes of a user.

There is a further need to provide a collar system that will allow an animal to be scented, but not become a hindrance to the animal as the animal travels about.

SUMMARY

It is therefore an objective of the present invention to provide a device that will allow a masking or neutralization of the scent of an animal to occur.

It is also an objective the present invention to provide a restraint system for an animal that will allow a handler to have control of the animal in a safe and efficient manner.

It is a still further objective of the present invention to provide a collar system to allow an individual to accessorize and personalize their pet.

It is also an objective of the present invention to provide a collar system that will allow the scent of an animal to change and additionally allow the scents dispersed by the collar to be modified according to the wishes of a user.

It is a further objective of the present invention to provide a collar system that will allow an animal to be scented, but not become a hindrance to the animal as the animal travels about.

The objectives of the present invention are achieved as illustrated and described. The present invention provides a fashion accessory, such as a collar, having a support band with a first and a second end, a scented material, and a connection arrangement on the support band, the connection arrangement configured to hold the first and the second end in a desired configuration, wherein the support band has a scent providing arrangement to store a scented material to disperse a scent into an environment around an animal.

The objectives of the present invention are also achieved by a second embodiment of the invention. The second embodiment of the invention provides a fashion accessory, such as a collar for an animal, comprising a support band; and a scent arrangement arranged in the support band for delivering a scent to the animal.

DETAILED DESCRIPTION

Figure 1:
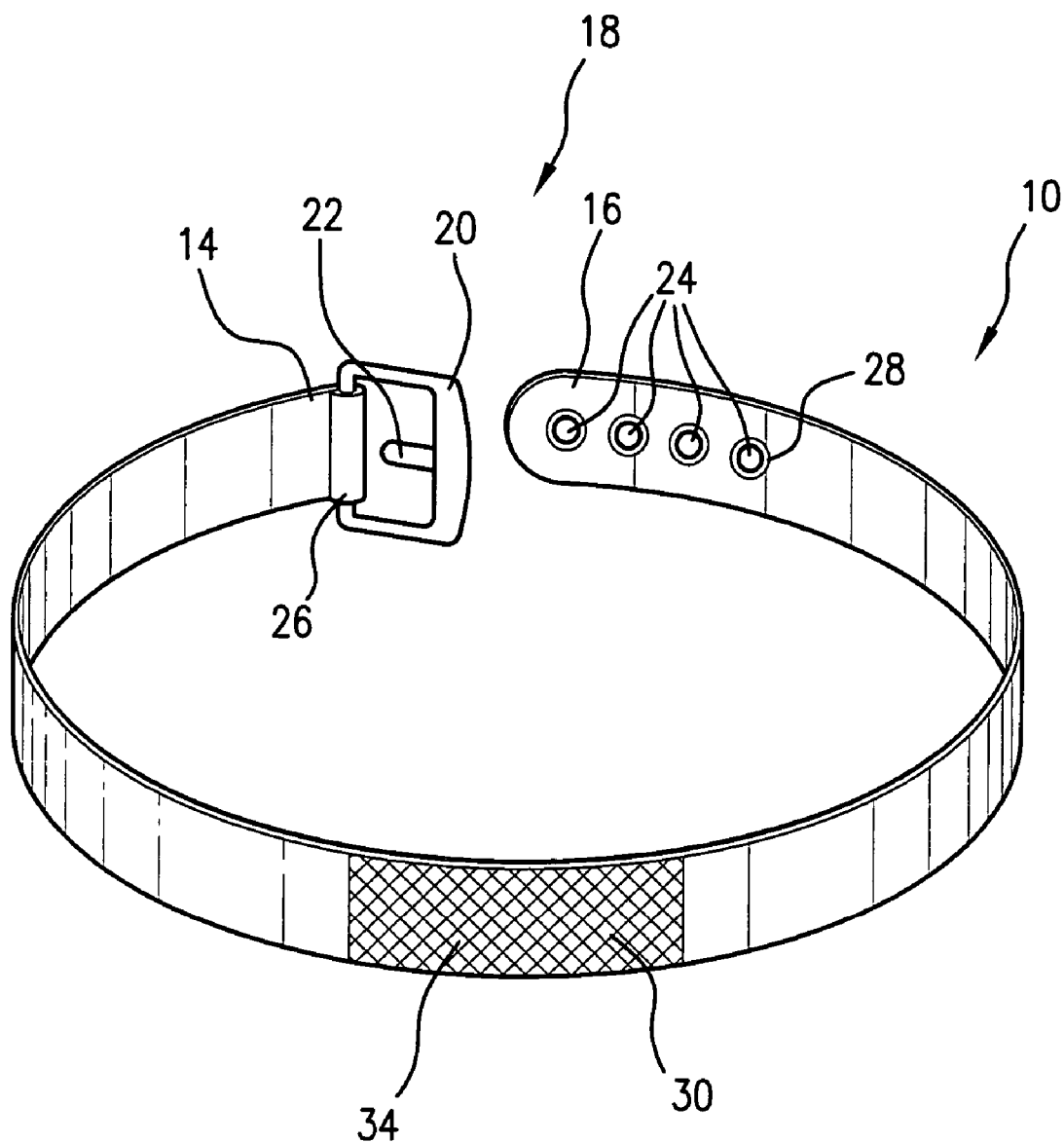
FIG. 1 is a perspective view of a collar in conformance with the present invention.

Referring to FIG. 1, a collar 10 is illustrated. The collar 10 may be worn, as a non-limiting example, around the neck of an animal. The collar 10 is configured with a support band 12 which has a first end 14 and a second end 16. The first end 14 and the second end 16 are used to form a connection arrangement 18 and therefore form a support band 12 in the shape of a circle. The collar 10 is formed such that the size of the circle formed is within a defined range for use by an animal of a given size. The collar 10 may be altered such that the overall size is adjustable through the connection arrangement 18. The connection arrangement 18 may be a buckle and loop design, wherein the second end 16 is configured with through holes 24 in the support band 12. The first end 14 can be configured with a buckle 20 incorporating a tine 22 which is used to protrude through the holes 24 in the support band 12. The tine 22 is connected to the rest of the buckle 20 in a pivot connection 26. The tine 22 and the buckle 20 may be made of any suitable material sufficient to withstand loading forces of shear and bending, such as stainless steel, aluminum, brass and high density plastic as non-limiting examples. To prevent ripping of the collar material, hole reinforcements 28 may be inserted into the holes 24. The hole reinforcements 28 may be made of a similar material to the tine 22 and buckle 20 combination to prevent wear on any of the interfacing pieces. The collar 10 illustrated in FIG. 1 is configured of leather, however other materials including plastic and woven materials may be employed depending on the requirements of the user.

A scent-providing arrangement 30 is provided in the collar 10 to allow the dispersal of scents incorporated into the collar 10. The scent-providing arrangement 30 in the illustrated embodiment is a mesh pocket 30 configured into the collar 10. The mesh pocket 30 has a closure mechanism 32, such as a Velcro flap or a zipper, to allow the interior of the mesh pocket 30 to be reached. Multiple mesh pockets 30 may be used in the collar 10. A scented material 34 is added into the mesh pocket 30 wherein it is supported. The scented material 34 is open to the ambient air, thereby allowing scents generated by the material to escape through the mesh pocket 30 and into the atmosphere. Due to the configuration of the arrangement 30, the scented material 34 is easily reached by the animal handler. In an alternate example embodiment illustrated in FIG. 2, the scented material 34 is incorporated into the body of the support strap 12 in liquid form thereby making the scented materials removable only through a dispersal arrangement.

Figure 2:
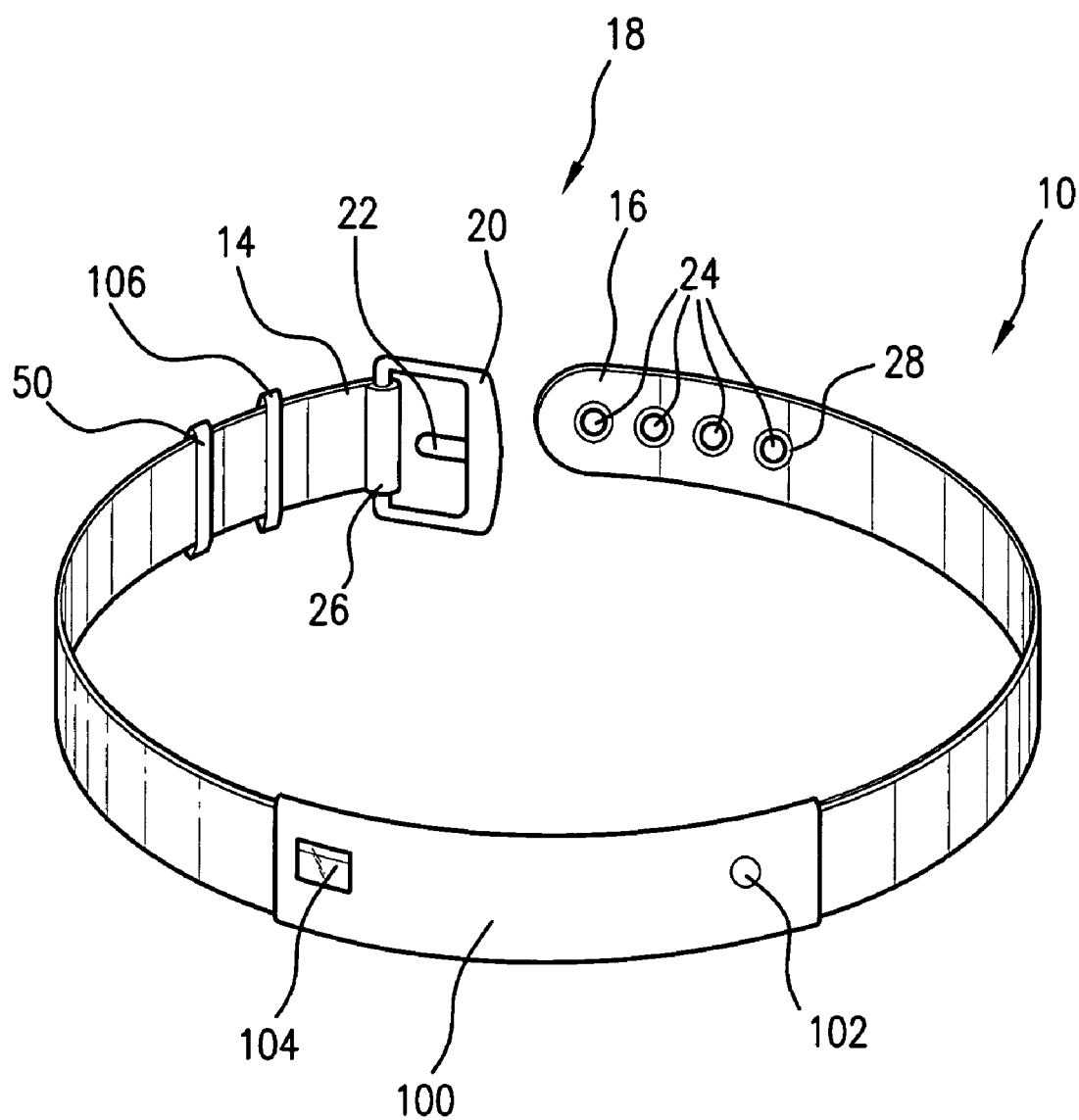
FIG. 2 is a perspective view of a collar with a liquid based scent dispensing arrangement.

As illustrated in FIG. 2, the collar 10 allows for a liquid, gel, suspension or other material to be incorporated into the support band 12 thereby allowing use of liquid scented materials. A chamber 100 is provided in the collar 10 to store the liquid. The collar 10 may be recharged with scented liquid through a port 102 provided in the support band 12. A level indicator 104 may also be incorporated into the support band 12 whereby a user can determine the amount of liquid remaining in the support band 12.

The support band 12 may also be configured as a single piece unit without ends. In this configuration, the band 12 is slipped onto the neck of an animal, such as a dog, over the head and ears of the animal.

A loop 50 may be utilized to allow for the connection of the support band 12 to an animal leash. The loop 50 and leash connection can be established such that the loop 50 breaks away if excessive force is placed on the loop 50 to prevent animal strangulation from occurring. An additional storage loop 106 is provided such that a loose second end 16 may be tucked under the storage loop 106 for safety.

Differing scents may be used in conjunction with the collar 10. These scents can include natural scents such as peppermint, rosemary, chamomile, spearmint, honey extract, vanilla, rose or other similar materials. The strength of the scent provided can be varied by diluting or increasing the concentration of scenting materials used with the collar 10 as well as regulating, as in the example embodiment provided in FIG. 2, the amount of fluid dispersed. In the example embodiments illustrated, the scented materials may last for between 1 and 3 months. Other configurations are possible and therefore the illustrated embodiment is merely exemplary in nature. The scents may be incorporated into solid form, such as a scented block, and incorporated into the collar 10. The scented material may also be in the form of pull-tab scented strips, wherein if a refreshing of the collar is needed, the outer layer (depleted) strip is removed and a new exterior outer layer is exposed to the atmosphere. The strips are incorporated into the body of the collar 12 in the mesh pockets. The material may also be a non-toxic air freshener material which may be replaced in the color at the discretion of the user. Alternatively, the collar 10 may be a single piece unit with the scent producing arrangement incorporated into the collar 10 wherein after the scent producing arrangement is depleted, the collar 10 may be discarded.

The materials used in the collar 10 system, including the scenting arrangements, are chosen such that they are non damaging to the animal which will wear the collar 10. The liquids and\or solids used in the scenting arrangement are chosen to be biodegradable and nontoxic to animals in case of accidental ingestion. Materials chosen to produce the scents, additionally, are chosen to minimize irritation to the animal during wearing of the collar 10.

The present invention provides many advantages over conventional collars. The present invention provides a collar which allows the user to personalize and accessorize a pet. The present invention provides a scented collar which allows for masking of odors which are naturally produced by an animal. This allows the individual who owns the pet to enjoy time spent with the animal. The present invention can also incorporate different visual identifiers, such as colors of the collar 10, artistic designs, or visual identifiers, such as charms, to allow others to visually determine which scents the collar includes. The present invention can be worn as a fashion accessory by an individual or an animal.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are accordingly to be regarded in an illustrative rather than in a restrictive sense.

What is claimed is:

1. A fashion accessory, comprising:
 a support band with a first and a second end;
 a scented material; and
 a connection arrangement on the support band, the connection arrangement configured to hold the first and the second end in a desired configuration, wherein the support band has a scent providing arrangement to store a scented material to disperse a scent into an environment, wherein the scent providing arrangement is a mesh pocket in which the scented material is stored, wherein the scent providing arrangement is a liquid containing reservoir and dispenser in the support band and wherein the liquid containing reservoir has an inlet to allow a user to incorporate liquid into the reservoir.

2. The fashion accessory according to claim 1, wherein the connection arrangement is a buckle and loop combination.

3. The fashion accessory according to claim 1, wherein the support band is made of leather.

4. The fashion accessory according to claim 1, further comprising:
 a leash attachment on the support band.

5. The fashion accessory according to claim 1, wherein the scent providing arrangement allows a handler to insert and remove scented materials from the collar.

6. The fashion accessory according to claim 1, wherein the scent providing arrangement is incorporated into the support band.

7. The fashion accessory according to claim 1, wherein the liquid dispensing reservoir is configured to dispense a gel.

* * * * *